US008805954B2

(12) United States Patent
Curcio et al.

(10) Patent No.: US 8,805,954 B2
(45) Date of Patent: Aug. 12, 2014

(54) METHOD AND APPARATUS FOR PROVIDING MEDIA MIXING WITH REDUCED UPLOADING

(75) Inventors: Igor Danilo Diego Curcio, Tampere (FI); Sujeet Shyamsundar Mate, Tampere (FI); Francesco Cricri, Tampere (FI)

(73) Assignee: Nokia Corporation, Espoo (FI)

( * ) Notice: Subject to any disclaimer, the term of this patent is extended or adjusted under 35 U.S.C. 154(b) by 165 days.

(21) Appl. No.: 13/022,239

(22) Filed: Feb. 7, 2011

(65) Prior Publication Data
US 2012/0203925 A1 Aug. 9, 2012

(51) Int. Cl.
*G06F 15/16* (2006.01)
(52) U.S. Cl.
USPC .......................................................... 709/217
(58) Field of Classification Search
USPC .................. 709/217–219, 201–203; 707/769; 715/715–717; 725/46–49; 381/119
See application file for complete search history.

(56) References Cited

U.S. PATENT DOCUMENTS

| | | | |
|---|---|---|---|
| 2003/0093790 A1 | 5/2003 | Logan et al. | |
| 2005/0015713 A1* | 1/2005 | Plastina et al. | 715/500.1 |
| 2006/0136556 A1* | 6/2006 | Stevens et al. | 709/203 |
| 2007/0014422 A1* | 1/2007 | Wesemann et al. | 381/119 |
| 2007/0078896 A1* | 4/2007 | Hayashi et al. | 707/104.1 |
| 2009/0089352 A1* | 4/2009 | Davis et al. | 709/201 |

FOREIGN PATENT DOCUMENTS

| | | |
|---|---|---|
| EP | 2 161 668 A1 | 3/2010 |
| WO | WO 2008/033840 A2 | 3/2008 |

OTHER PUBLICATIONS

International Search Report and Written Opinion for Application No. PCT/FI2012/050020 dated Jan. 11, 2012.

* cited by examiner

*Primary Examiner* — Chirag R Patel
(74) *Attorney, Agent, or Firm* — Alston & Bird

(57) ABSTRACT

A method for providing media mixing with reduced uploading may include receiving device situation description data and content analysis data from each of a plurality of devices. The device situation description data and content analysis data received from each of the plurality of devices may be descriptive of media data associated with a common event and recorded separately at respective ones of the plurality of devices. The method may further include determining media segments defining one or more portions of the media data to be requested from selected ones of the plurality of devices based on the device situation description data and content analysis data, causing communication of a request for corresponding ones of the media segments to respective devices among the selected ones of the plurality of devices, and causing generation of mixed content based on receipt of the media segments. A corresponding apparatus and user terminal-side method and apparatus are also provided.

20 Claims, 6 Drawing Sheets

METHOD AND APPARATUS FOR PROVIDING MEDIA MIXING WITH REDUCED UPLOADING

TECHNOLOGICAL FIELD

Embodiments of the present invention relate generally to content sharing technology and, more particularly, relate to a method and apparatus for providing media mixing with reduced uploading.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users by expanding the capabilities of mobile electronic devices. One area in which there is a demand to increase ease of information transfer relates to the sharing of information between multiple devices and potentially between multiple users. In this regard, given the ability for modern electronic devices to create and modify content, and also to distribute or share content, it is not uncommon for users of such devices to become prolific users and producers of media content. Networks and services have been developed to enable users to move created content to various points within the networks or experience content at various points within the networks.

Various applications and software have also been developed and continue to be developed in order to give the users robust capabilities to perform tasks, communicate, obtain information or services, entertain themselves, etc. in either fixed or mobile environments. Given the robust capabilities of mobile electronic devices and the relatively small size of such devices, it is becoming increasingly common for individuals to keep mobile electronic devices on or near their person on a nearly continuous basis. Moreover, because such devices are useful for work, play, leisure, entertainment, and other purposes, many users also interact with their devices on a frequent basis. Accordingly, whether interaction occurs via a mobile electronic device or a fixed electronic device (e.g., a personal computer (PC)), more and more people are interacting with friends, colleagues and acquaintances via online networks. This trend has led to the rise of a number of social networking applications that span the entire spectrum of human interaction from purely professional to purely leisure activities and everything in between. Individuals in various groups may generate large amounts of content to be shared with others. Thus, it may be desirable to develop continued improvements to the manner by which content may be generated and shared amongst individuals.

BRIEF SUMMARY

A method, apparatus and computer program product are therefore provided for enabling the provision of media mixing with reduced uploading. In this regard, for example, some embodiments of the present invention may provide a mechanism by which mixed content may be produced faster and with less resource consumption. In this regard, for example, some examples may provide for a service that uses sensor and context data along with media analysis data to determine which portions of media data to request from potential contributors. Thus, rather than having all media data uploaded to the service, only the requested portions may be uploaded.

In one example embodiment, a method of providing media mixing with reduced uploading is provided. The method may include receiving device situation description data and content analysis data from each of a plurality of devices. The device situation description data and content analysis data received from each of the plurality of devices may be descriptive of media data associated with a common event and recorded separately at respective ones of the plurality of devices. The method may further include determining media segments defining one or more portions of the media data to be requested from selected ones of the plurality of devices based on the device situation description data and content analysis data, causing communication of a request for corresponding ones of the media segments to respective devices among the selected ones of the plurality of devices, and causing generation of mixed content based on receipt of the media segments.

In another example embodiment, a computer program product for providing media mixing with reduced uploading is provided. The computer program product includes at least one computer-readable storage medium having computer-executable program code instructions stored therein. The computer-executable program code instructions may include program code instructions for receiving device situation description data and content analysis data from each of a plurality of devices. The device situation description data and content analysis data received from each of the plurality of devices may be descriptive of media data associated with a common event and recorded separately at respective ones of the plurality of devices. The program code instructions may further include instructions for determining media segments defining one or more portions of the media data to be requested from selected ones of the plurality of devices based on the device situation description data and content analysis data, causing communication of a request for corresponding ones of the media segments to respective devices among the selected ones of the plurality of devices, and causing generation of mixed content based on receipt of the media segments.

In another example embodiment, an apparatus for providing media mixing with reduced uploading is provided. The apparatus may include at least one processor and at least one memory including computer program code. The at least one memory and the computer program code may be configured to, with the at least one processor, cause the apparatus to perform at least receiving device situation description data and content analysis data from each of a plurality of devices. The device situation description data and content analysis data received from each of the plurality of devices may be descriptive of media data associated with a common event and recorded separately at respective ones of the plurality of devices. The apparatus may be further configured for determining media segments defining one or more portions of the media data to be requested from selected ones of the plurality of devices based on the device situation description data and content analysis data, causing communication of a request for corresponding ones of the media segments to respective devices among the selected ones of the plurality of devices, and causing generation of mixed content based on receipt of the media segments.

In another example embodiment, an apparatus for providing media mixing with reduced uploading is provided. The apparatus may include means for receiving device situation description data and content analysis data from each of a plurality of devices. The device situation description data and content analysis data received from each of the plurality of devices may be descriptive of media data associated with a common event and recorded separately at respective ones of the plurality of devices. The apparatus may further include means for determining media segments defining one or more portions of the media data to be requested from selected ones of the plurality of devices based on the device situation description data and content analysis data, means for causing communication of a request for corresponding ones of the media segments to respective devices among the selected ones of the plurality of devices, and means for causing generation of mixed content based on receipt of the media segments.

In still another example embodiment, a method of providing media mixing with reduced uploading is provided. The method may include causing provision of device situation description data and content analysis data from a user terminal to a service platform. The device situation description data and content analysis data may be descriptive of media data associated with an event for which content is separately recorded by other devices associated with the service platform. The method may further include receiving a request for one or more corresponding media segments from the service platform. The media segments may define one or more portions of the media data determined to be requested by the service platform based on the device situation description data and content analysis data. The method may further include causing provision of the media segments requested to the service platform to enable mixing of media segments at the service platform with other media segments from the other devices.

In another example embodiment, a computer program product for providing media mixing with reduced uploading is provided. The computer program product includes at least one computer-readable storage medium having computer-executable program code instructions stored therein. The computer-executable program code instructions may include program code instructions for causing provision of device situation description data and content analysis data from a user terminal to a service platform. The device situation description data and content analysis data may be descriptive of media data associated with an event for which content is separately recorded by other devices associated with the service platform. The program code instructions may further include instructions for receiving a request for one or more corresponding media segments from the service platform. The media segments may define one or more portions of the media data determined to be requested by the service platform based on the device situation description data and content analysis data. The program code instructions may further include instructions for causing provision of the media segments requested to the service platform to enable mixing of media segments at the service platform with other media segments from the other devices.

In another example embodiment, an apparatus for providing media mixing with reduced uploading is provided. The apparatus may include at least one processor and at least one memory including computer program code. The at least one memory and the computer program code may be configured to, with the at least one processor, cause the apparatus to perform at least causing provision of device situation description data and content analysis data from a user terminal to a service platform. The device situation description data and content analysis data may be descriptive of media data associated with an event for which content is separately recorded by other devices associated with the service platform. The apparatus may be further configured for receiving a request for one or more corresponding media segments from the service platform. The media segments may define one or more portions of the media data determined to be requested by the service platform based on the device situation description data and content analysis data. The apparatus may be further configured for causing provision of the media segments requested to the service platform to enable mixing of media segments at the service platform with other media segments from the other devices.

In another example embodiment, an apparatus for providing media mixing with reduced uploading is provided. The apparatus may include means for causing provision of device situation description data and content analysis data from a user terminal to a service platform. The device situation description data and content analysis data may be descriptive of media data associated with an event for which content is separately recorded by other devices associated with the service platform. The apparatus may further include means for receiving a request for one or more corresponding media segments from the service platform. The media segments may define one or more portions of the media data determined to be requested by the service platform based on the device situation description data and content analysis data. The apparatus may further include means for causing provision of the media segments requested to the service platform to enable mixing of media segments at the service platform with other media segments from the other devices.

Embodiments of the invention may provide a method, apparatus and computer program product for employment in network based content sharing environments. As a result, for example, individual device users may enjoy improved capabilities with respect to sharing content with a selected group of other device users.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
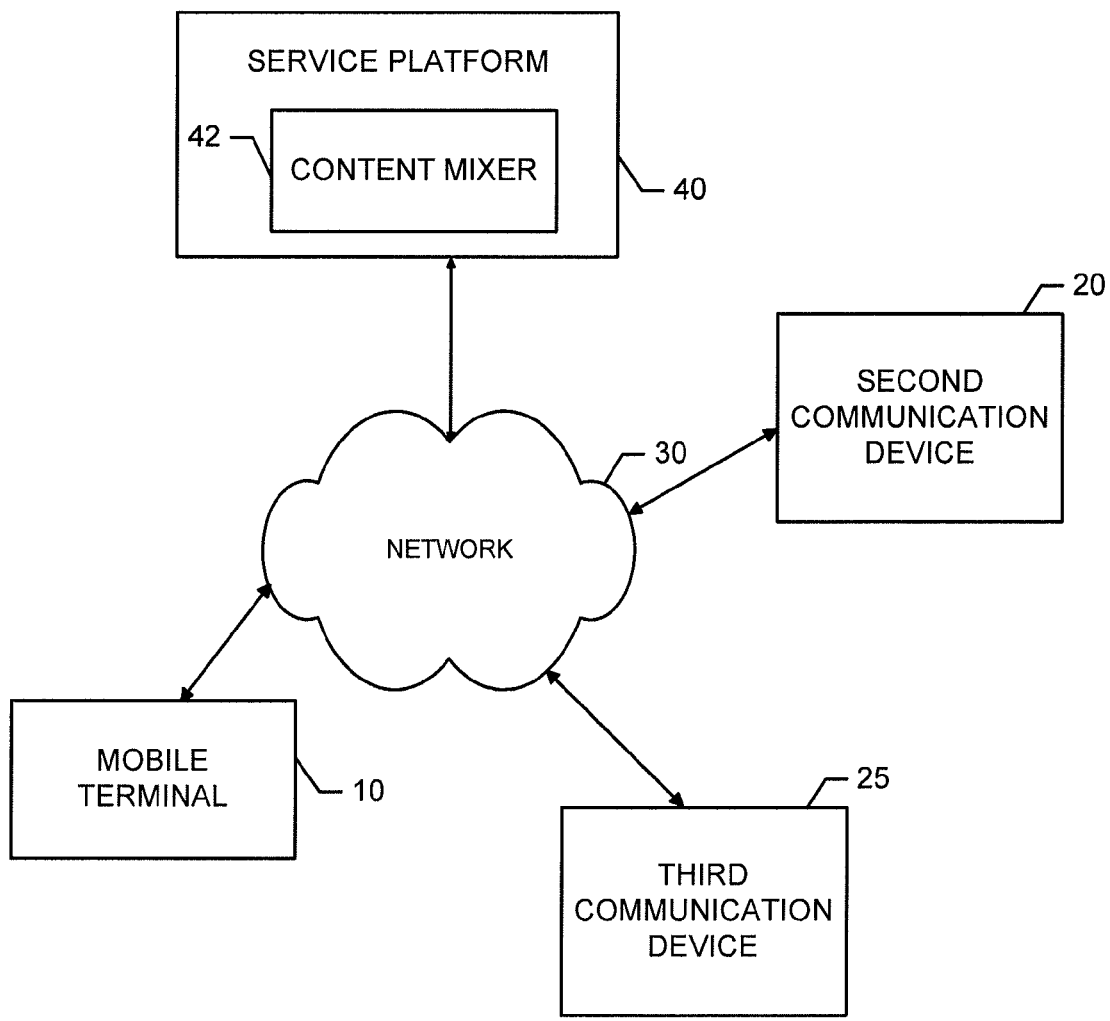
FIG. 1 is a schematic block diagram of a communication system according to an example embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Electronic devices have been rapidly developing in relation to their communication and content sharing capabilities. As the capabilities of such devices have increased, applications and services have grown to leverage the capabilities to provide increased utility and improved experience for users. Social networks and various services and functionalities supporting social networks are examples of mechanisms developed to leverage device and network capabilities to provide users with the ability to communicate with each regarding shared experiences.

As such, users of social networking applications often use the social network as a mechanism by which to distribute content to others. Moreover, in some situations, a plurality of users belonging to the same social group, or at least being associated with a common service, may experience similar phenomena or events and independently generate content associated therewith. For example, in some cases, there may be a number of individuals recording or generating content at or near a particular event such as a social gathering, political event, concert or sporting event. Each of the individuals may have different devices that may have respective different performance capabilities. Additionally, each of the individuals may have a different perspective on the events. Accordingly, it may be advantageous to pool together bits of content from various ones of the individuals into a collage or combination of content that can be shared with some or all participants. This type of media combination is sometimes referred to as generating a "director's cut".

The use of a service that may assist with the generation of a director's cut often relies on the uploading or submission of the content to a central location such as a server. For example, each participant may first record media content (e.g., audio and/or video, images, etc.) associated with an event at his or her mobile device. Each participant may then upload a full recording of the media content recorded by the mobile device of the corresponding participant to the service (e.g., to the server). The service may then use the multiple different uploaded files to select portions from different files in order to generate a remixed or summary content item to form the director's cut.

Using the approach described above, the uploading of content can sometimes form a bottleneck. In this regard, given current wireless network transmission technologies, expected latency for upload operations is not negligible since the best networks typically have limited availability. Additionally, the fact that wireless bearers are often shared may make real transmission speeds much lower than the rated speeds for various networks. Transmission speeds can also be impacted by factors such as whether the transmitting device is mobile or stationary. As such, experienced speeds for uploading content for content mixing, as described above, may be lower than expected and cause noticeable delays in the ability of the service to provide mixed content (e.g., a director's cut).

Some example embodiments of the present invention may reduce the upload bottleneck by reducing the amount of data that is uploaded. For example, some example embodiments may provide for mobile devices that are associated with a service for providing content mixing (e.g., director's cut or remixing services) to initially upload sensor and context data to the service, where the sensor and context data are associated with the period during which media data is recorded or generated. The sensor and context data, which may be provided to the service substantially in real-time (e.g., during media data recording) or some later time after the content is recorded, may be a relatively small amount of data that can be uploaded quickly to the service. The sensor and context data may be indicative of the conditions encountered while recording content and, the location and situation at the time of the content recording. In some cases, the mobile devices may also upload media analysis data to the service. The media analysis data may communicate feature data descriptive of the media data. Thus, the media analysis data may also be a relatively smaller data set than the whole media data recording. The service may then utilize the sensor and context data along with the media analysis data to determine which portions of the media data recordings to request from selected ones of the respective contributors. Each selected respective contributor may then only need to upload the requested portions of the media data. The requested portions from each selected respective contributor may then be mixed to produce mixed content or summary content (e.g., a director's cut).

By utilizing an example embodiment, the amount of data that is uploaded to the service may be reduced significantly, and thus delays associated with uploading may be reduced correspondingly. Moreover, the sensor and context data along with the media analysis data may be provided substantially in real time or delayed, but in any case much quicker and with less resource consumption than the time and/or resources that would be required to upload full and inclusive media data files. For some devices that would otherwise have uploaded entire files, either no media data at all or at least much smaller media data segments may be uploaded. Thus, the mixed content may be produced with much less time and resource consumption.

FIG. 1 illustrates a generic system diagram in which a device such as a mobile terminal 10, which may benefit from embodiments of the present invention, is shown in an example communication environment. As shown in FIG. 1, an embodiment of a system in accordance with an example embodiment of the present invention may include a first communication device (e.g., mobile terminal 10) and a second communication device 20 capable of communication with each other via a network 30. In some cases, embodiments of the present invention may further include one or more network devices such as a service platform 40 with which the mobile terminal 10 (and possibly also the second communication device 20) may communicate to provide, request and/or receive information. Furthermore, in some cases, the mobile terminal 10 may be in communication with the second communication device 20 (e.g., a PC or another mobile terminal) and one or more additional communication devices (e.g., third communication device 25), which may also be either mobile or fixed communication devices.

The mobile terminal 10 may be any of multiple types of mobile communication and/or computing devices such as, for example, portable digital assistants (PDAs), pagers, mobile televisions, mobile telephones, gaming devices, laptop computers, cameras, camera phones, video recorders, audio/video player, radio, global positioning system (GPS) devices, or any combination of the aforementioned, and other types of voice and text communications devices. The second and third communication devices 20 and 25 may be any of the above listed mobile communication devices or an example of a fixed communication device such as a PC or other computing device or communication terminal having a relatively fixed location and wired or wireless access to the network 30.

The network 30 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like.

One or more communication terminals such as the mobile terminal 10 and the second and third communication devices 20 and 25 may be in communication with the network 30 and/or with each other via the network 30. Thus each communication terminal may include an antenna or antennas for transmitting signals to and for receiving signals from a base site, which could be, for example a base station that is a part of one or more cellular or mobile networks or an access point that may be coupled to a data network, such as a local area network (LAN), a metropolitan area network (MAN), and/or a wide area network (WAN), such as the Internet. Alternatively, such devices may include communication interfaces supporting landline based or wired communication with the network 30. In turn, other devices such as processing elements (e.g., personal computers, server computers or the like) may be coupled to the mobile terminal 10 and/or the second and third communication devices 20 and 25 via the network 30. By directly or indirectly connecting the mobile terminal 10 and/or the second communication device 20 and other devices to the network 30, the mobile terminal 10 and/or the second and third communication devices 20 and 25 may be enabled to communicate with the other devices or each other, for example, according to numerous communication protocols including Hypertext Transfer Protocol (HTTP) and/or the like, to thereby carry out various communication or other functions of the mobile terminal 10 and the second and third communication devices 20 and 25, respectively.

Furthermore, although not shown in FIG. 1, the mobile terminal 10 and the second and third communication devices 20 and 25 may communicate in accordance with, for example, radio frequency (RF), Bluetooth (BT), Infrared (IR) or any of a number of different wireline or wireless communication techniques, including LAN, wireless LAN (WLAN), Worldwide Interoperability for Microwave Access (WiMAX), WiFi, ultra-wide band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as WLAN, WiMAX, and/or the like and fixed access mechanisms such as digital subscriber line (DSL), cable modems, Ethernet and/or the like.

In example embodiments, regardless of the form of instantiation of the devices involved, embodiments of the present invention may relate to the provision of access to content within the context of a social network or other set of individuals including a defined group of users and/or the devices of the users. The group may be predefined based on any of a number of ways that a particular group may be formed. In this regard, for example, invited members may accept invitations to join the group, applications may be submitted and accepted applicants may become group members, or a group membership manager may define a set of users to be members of a group. Thus, for example, group members could be part of a social network or may be associated with a particular service such as a service hosted by or associated with the service platform 40. Accordingly, it should be appreciated that, although FIG. 1 shows three example devices capable of communication, some embodiments may include groups like social networks with the potential for many more group members and corresponding devices. Thus, FIG. 1 should not be seen as being limiting in this regard.

In an example embodiment, the service platform 40 may be a device or node such as a server or other processing circuitry. The service platform 40 may have any number of functions or associations with various services. As such, for example, the service platform 40 may be a platform such as a dedicated server, backend server, or server bank associated with a particular information source, function or service. Thus, the service platform 40 may represent one or more of a plurality of different services or information sources. The functionality of the service platform 40 may be provided by hardware and/or software components configured to operate in accordance with known techniques for the provision of information to users of communication devices, except as modified as described herein.

In an example embodiment, the service platform 40 may provide, among other things, content management, content sharing, content acquisition and other services related to communication and media content. Nokia's Ovi suite is an example of a service provision mechanism that may be associated with the service platform 40. In some cases, the service platform 40 may include, be associated with, or otherwise be functional in connection with a content mixer 42. However, the content mixer 42 could alternatively be embodied at one or more of the mobile terminal 10 and/or the second and third communication devices 20 and 25, or even at some other device within the network. As such, for example, in some cases the network 30 could be an ad hoc, peer-to-peer (P2P) network in which the content mixer 42 is embodied in at least one of the devices forming the P2P network. Thus, although the content mixer 42 is shown as a separate entity in FIG. 1, it should be appreciated that the content mixer 42 could be associated directly with or even instantiated at any of the other devices shown in FIG. 1 in various alternative embodiments. In any case, as will be discussed in greater detail below, the content mixer 42 according to one example may provide mixed content in the form of audio, video, graphics, images and/or other media types including portions of content generated from among media data submitted from different devices after submission of the content to the content mixer 42. Moreover, the content mixer 42 of some example embodiments may be configured to direct various group members (e.g., selected ones of the submitters of content such as selected ones of the mobile terminal 10 and/or the second and third communication devices 20 and 25) as to which segments of media data they are to submit based on sensor and context data received from each member and media analysis data received from each member. The content mixer 42 (or the service platform 40) may then distribute the mixed content to all or selected group members.

In an example embodiment, the service platform 40 may be associated with the provision of functionality and services associated with social networking. Thus, for example, the service platform 40 may include functionality associated with enabling group members to share social interaction media with each other. As such, the service platform 40 may act as or otherwise include a social content server or another social networking server for providing the social interaction media to group members based on individual participant media submissions from various ones of the group members. However, the service platform 40 need not necessarily perform social networking functions in all cases.

Figure 2:
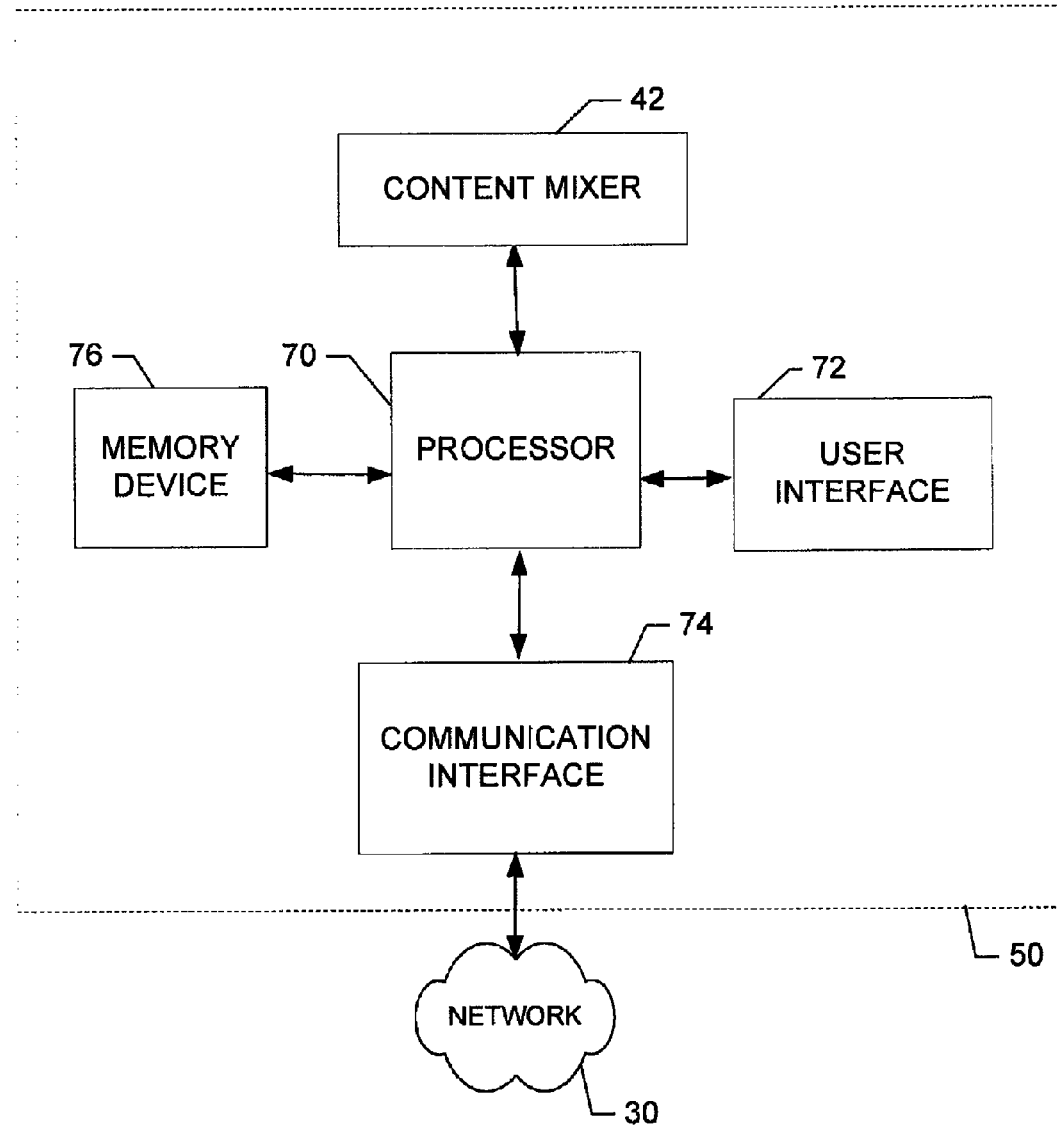
FIG. 2 is a schematic block diagram of an apparatus for providing media mixing with reduced uploading according to an example embodiment of the present invention.

FIG. 2 illustrates a schematic block diagram of an apparatus for enabling the provision of media mixing with reduced uploading according to an example embodiment of the present invention. An example embodiment of the invention will now be described with reference to FIG. 2, in which certain elements of an apparatus 50 for providing media mixing with reduced uploading are displayed. The apparatus 50 of FIG. 2 may be employed, for example, on a communication device (e.g., the service platform 40 or any of the devices listed above). Alternatively, embodiments may be employed on a combination of devices. Accordingly, some embodiments of the present invention may be embodied wholly at a single device (e.g., the mobile terminal 10 or the service platform 40) or by devices in a client/server relationship. Furthermore, it should be noted that the devices or elements described below may not be mandatory and thus some may be omitted in certain embodiments.

Referring now to FIG. 2, an apparatus 50 for providing media mixing with reduced uploading is provided. The apparatus 50 may include or otherwise be in communication with a processor 70, a user interface 72, a communication interface 74 and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, applications, instructions or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70. In some embodiments, the memory device 76 may also or alternatively store content items (e.g., media content, documents, chat content, message data, videos, music, pictures and/or the like).

The apparatus 50 may, in some embodiments, be the service platform 40 (or a component device thereof), the mobile terminal 10 or other computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied in hardware as one or more of various processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), central processing unit (CPU), a hardware accelerator, a vector processor, a graphics processing unit (GPU), a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a content mixing device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

The user interface 72 (if employed) may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, soft keys, a microphone, a speaker, or other input/output mechanisms. In an example embodiment in which the apparatus is embodied as a server or some other network devices (e.g., the service platform 40), the user interface 72 may be limited, or eliminated. However, in an embodiment in which the apparatus is embodied as a communication device (e.g., the mobile terminal 10 or the second or third communication device 20 or 25), the user interface 72 may include, among other devices or elements, any or all of a speaker, a microphone, a display, and a keyboard or the like. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

Meanwhile, the communication interface 74 may be any means such as a device or circuitry embodied in either hardware, or a combination of hardware and software, that is configured to receive and/or transmit data from/to a network and/or any other device or module in communication with the apparatus. In this regard, the communication interface 74 may include, for example, an antenna (or multiple antennas) and supporting hardware and/or software for enabling communications with one or more wireless communication networks. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

In an example embodiment, the processor 70 may be embodied as, include or otherwise control the content mixer 42. As such, in some embodiments, the processor 70 may be said to cause, direct or control the execution or occurrence of the various functions attributed to the content mixer 42 as described herein. The content mixer 42 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the content mixer 42 as described herein. Thus, in examples in which software is employed, a device or circuitry (e.g., the processor 70 in one example) executing the software forms the structure associated with such means.

In an example embodiment, the content mixer 42 may be configured to receive sensor and context data from a plurality of mobile terminals (e.g., any or all of the mobile terminal 10, the second communication device 20, the third communication device 25, and perhaps additional devices as well). The sensor and context data may include information descriptive of the current situation of the device providing the data (e.g., situation description data). Thus, the sensor and context data (or situation description data) may provide information indicative conditions at the device while the device is recording or generating media data. As such, for example, the sensor and context data my provide information indicative of the location of the device, orientation of the device (e.g., tilt, panning angle, etc.), environmental conditions near the device, video shake, and/or data from other sensors (e.g., accelerometers, altimeters, proximity sensors, light sensors, gyroscopes, electronic compasses, GPS devices, etc.). In some cases, the sensor and context data may include information indicative of camera sensor data (e.g., digital/analog gain, brightness, etc.). In some embodiments, the sensor and context data may be raw sensor data that may be processed by the content mixer 42 in order to determine the context of the device from which the sensor and context data was received. However, in other examples, the sensor and context data may be derived sensor data and context data that has been analyzed at the device from which the data was received and has been derived from the analysis of the raw sensor data or context data such as device state or the like.

The sensor and context data may be received by the content mixer 42 substantially in real time (e.g., while media data is being captured) or at some later time. The sensor and context data may be received via any suitable transport protocol (e.g., HTTP, SIP (session initiation protocol), RTP (real-time transport protocol), SMS (short message service), etc.) and in any suitable format (e.g., text, XML (extensible markup language), SDP (session description protocol), BINARY, etc.). The sensor and context data may also include information indicative of an identity of the mobile device from which the sensor and context data was received, information indicative of a time period over which the media data to which the sensor and context data corresponds was gathered, and/or other information about the media data.

In some examples, the content mixer 42 may also be configured to receive media analysis data from various respective devices of the group or set of devices providing data corresponding to a common event. The media analysis data may also be provided by any suitable transport protocol and in any suitable format. The analysis of the media data, from which the media analysis data results, may be accomplished substantially in real time (e.g., while media data is being captured) or at some later time. The transmission of the media analysis to the content mixer 42 may also occur either substantially in real time or at some later time.

The media analysis data may include analysis of captured video, audio, images or other media itself. As such, for example, the media analysis data (e.g., content description data) may include video brightness, shake, panning or tilt detection as performed from content analysis techniques, and/or other content analysis results for a defined video or audio segment or images. The segment size of the defined video or audio segment may be determined in terms of a number of frames or based on start and end times. The media analysis data may also or alternatively include information indicative of recorded audio quality, audio feature extraction (e.g., fingerprints), pre-processing for audio alignment (e.g., extraction of audio features used by an audio alignment algorithm employed in the content mixer 42), or other audio-related signal processing. Media quality evaluation may be performed relative to a standard or any common quality metric that may be provided by the content mixer 42 to terminals providing data to the content mixer 42 (either before or during recording) so that terminals providing the data can perform media quality evaluations, and in some cases also perform rankings, locally and independently of other terminals while still using common metrics.

In an example embodiment, the content mixer 42 may be configured to perform audio time alignment of different clips or files of media data provided from different respective devices based on received audio feature vectors from the media analysis data provided by each respective device. Thus, for example, transmission of full media data files may not be necessary. The performance of pre-processing for audio alignment (e.g., via audio feature extraction) by the devices themselves may not be needed in some cases.

In an example embodiment, the content mixer 42 may be configured to utilize the sensor and context data (e.g., device situation description data) and the media analysis data (e.g., content description data) received from each contributing device to select specific portions of the media data recorded at selected ones of the contributing devices. The content mixer 42 may be configured to then request the specific portions from the selected ones of the contributing devices. The specific portions requested may be selected based on indications of quality, desired location or view, or any other criteria. The specific portions requested may be indicated with respect to temporal criteria (e.g., via request of data covering specific time periods or via request of specific data frames) or with respect to other criteria. As an example of other criteria, user feedback may be accounted for with respect to operation of the content mixer 42. For example, if user feedback such as voting data, thumbs up/down, relevance feedback and/or the like may exist with respect to a particular portion of the media data (e.g., one or more media segments) and thereby provide some indication of importance or priority of the corresponding media segments, the content mixer 42 may request data having a priority associated therewith. Conditions for assignment of priority may include, for example, sensor availability (e.g., tri-axial accelerometer, tri-axial magnetometer, gyroscope, GPS, Indoor-positioning sensor, etc), recording device capability (e.g., resolution, frame rate, bit rate, codec, etc.), network connectivity of the device when the content mixer 42 requests data (e.g., assigning a higher priority to communication over WLAN than communication over a 3G network), and/or the like. Media segments may be requested, and in some cases therefore received also, based on the priority. In some cases, the content mixer 42 may request a single media type or class only (e.g., only video, audio or images), or multiple media types or classes (e.g., audio and video).

After media segments have been requested, the content mixer 42 may wait to receive responses from the devices to which requests were sent. As indicated above, even though a set of devices may each provide sensor and context data along with media analysis data to the content mixer 42, the content mixer 42 may select media segments from a subset of the set of devices. However, in some cases, the content mixer 42 may request media segments from the entire set. The segments requested may represent a non-redundant set of media segments that can be combined to provide coverage of an entire range of times or frames for which production of a composite or summary media file of mixed content is desired. However, in other cases, the content mixer 42 may request some overlapping content or redundant media segments. The redundant media segments may be useable for split screen views, composite views or to ensure that enough data is received without submitting additional requests in case some devices to which requests are sent do not respond or in cases where some devices have been found to be on low bandwidth network. In cases where a particular device to which a request is sent, but no response is received (either at all or within a predetermined time limit), the content mixer 42 may request a corresponding media segment from another device. The request may be issued to a device having high priority data covering the corresponding frames or time period, or to a device that has demonstrated reliability by providing media segments already.

After all or sufficient ones of the requested media segments have been received by the content mixer 42, the content mixer 42 may be configured to produce mixed content as a summary or composite of the media segments received. In some cases, the content mixer 42 may even produce the mixed content with less than all of the requested media segments being received. After the content mixer 42 has produced the mixed content, the content mixer 42 may publish the mixed content at a location that is accessible to the contributing devices (and/or perhaps also additional or other devices). Alternatively or additionally, the content mixer 42 may transmit the mixed content to the contributing devices (and/or perhaps also additional or other devices). In some embodiments, the content mixer 42 may request other media segments, and in some cases all remaining portions of the media segments not sent previously, in order to complete uploading of the media data in a less time critical fashion. In some cases, the additional requests may be governed by priorities or rules established for the content mixer 42 by one or more users, by the group, or by a network entity.

Figure 3:
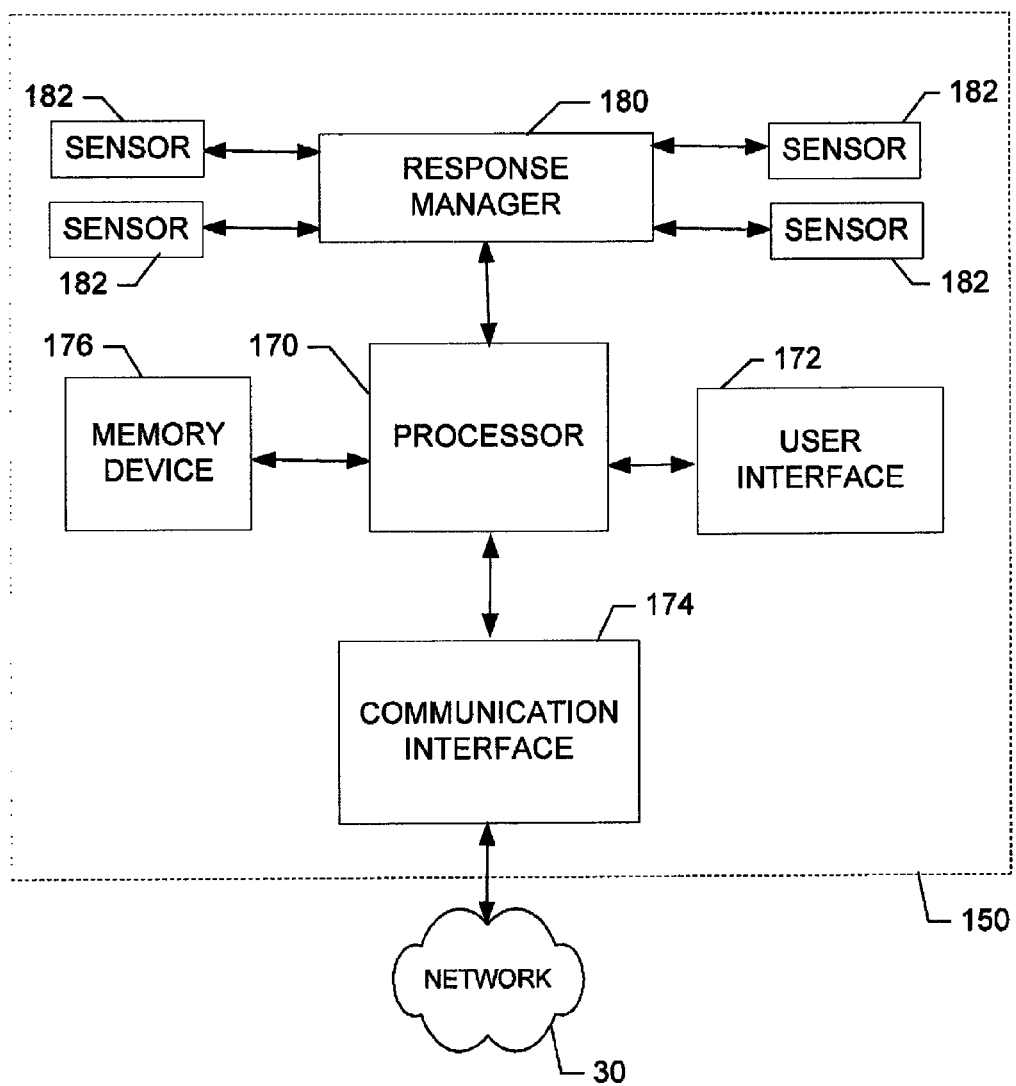
FIG. 3 is a schematic block diagram of an apparatus for facilitating media mixing with reduced uploading from a user terminal according to an example embodiment of the present invention.

FIG. 3 illustrates a block diagram of another apparatus 150 (e.g., a contributing device side apparatus) that may operate according to an example embodiment. The apparatus 150 may be an apparatus configured to provide media segments to the apparatus 50 of FIG. 2 via the system of FIG. 1. Thus, for example, the apparatus 150 may be an example of the mobile terminal 10, the second communication device 20 and/or the third communication device 25. As shown in FIG. 3, the apparatus 150 may include or otherwise be in communication with a processor 170, a user interface 172, a communication interface 174 and a memory device 176. The processor 170, user interface 172, communication interface 174 and memory device 176 may be substantially similar in function and basic structure (with perhaps semantic and/or scale differences in some cases) to the descriptions provided above for the processor 70, user interface 72, a communication interface 74 and memory device 76. Thus, descriptions of these components will not be repeated.

As indicated above, in some embodiments the apparatus 150 may be an example of the mobile terminal 10, the second communication device 20 and/or the third communication device 25. However, in some embodiments, the apparatus 150 may be embodied as a chip or chip set. In other words, the apparatus 150 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 150 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processor 170 may be embodied as, include or otherwise control a response manager 180 and one or more sensors 182. As such, in some embodiments, the processor 170 may be said to cause, direct or control the execution or occurrence of the various functions attributed to the response manager 180 and/or the sensors, respectively, as described herein. The response manager 180 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the response manager 180 as described herein. Thus, in examples in which software is employed, a device or circuitry (e.g., the processor 170 in one example) executing the software forms the structure associated with such means.

The response manager 180 may be configured to receive sensor data from the sensors 182 and provide sensor and context data to the content mixer 42 (e.g., via communication provided by the network 30) based on the sensor data and any context data (e.g., device state data) determinable by the response manager 180. As indicated above, the sensor and context data may be raw sensor data or analyzed sensor data. In cases where analyzed sensor data is provided, the response manager 180 may be configured to perform various types of sensor data processing to generate corresponding analyzed sensor data to the content mixer 42.

The response manager 180 may also be configured to provide media analysis data to the content mixer 42. Thus, for example, the response manager 180 may be configured to perform some types of content analysis to be able to determine such features as content brightness, color layout, scalable color, motion-related features, texture-related features, face detection, face identification, and various other visual feature extractions. For audio, the response manager 180 may be configured to perform audio quality analysis or audio classifications (e.g., differentiating speech or music) or other types of audio feature extraction. As such, the response manager 180 may be configured to receive sensor data and analyze content associated with media data being recorded and provide the sensor and context data (e.g., device situation description data) and the media analysis data (e.g., content description data) to the content mixer 42. Thereafter, the response manager 180 may be configured to receive requests from the content mixer 42 and provide requested media segments according to the requests received. In some cases, the response manager 180 may be configured to provide less than all of the medium contained in a media clip, if it is requested by the content mixer 42. For example, if an audio track is ranked as having poor quality, only the video track may be transmitted.

The sensors 182 may be any of numerous different types of sensing devices for gathering information on local environmental conditions and/or on device location or orientation. Thus, in some cases, the sensors 182 may include a positioning or movement sensor, altitude sensor, pressure sensor, or many other sensor devices. The sensors 182 may include, for example, an accelerometer, an inertial sensor, or other device capable of determining movement of the mobile terminal 10 (or the second communication device 20 or third communication device 25) relative to some reference. In some embodiments, the sensors 182 may include hardware for supporting functionality of the sensors 182 including an on-board processor and memory for storing instructions that, when executed by the on-board processor, configure the sensors 182 to perform corresponding functionality defined by the instructions. In some cases, however, the sensors 182 may utilize other processing resources of the mobile terminal 10 (or the second communication device 20 or third communication device 25). In some cases, the sensors 182 may include a gyroscope for determining angular speed, a proximity sensor for proximity information, a thermometer for measuring temperature, a light sensor for detecting light, or other sensors for any other type of information described herein. In an example embodiment, shake, tilt, angular velocity, camera panning, device orientation, brightness, etc. and/or other characteristics may be determined by the sensors 182 and provided to the response manager 180 to enable the response manager 180 to provide the sensor and context data to the content mixer 42 along with the media analysis data.

Figure 4:
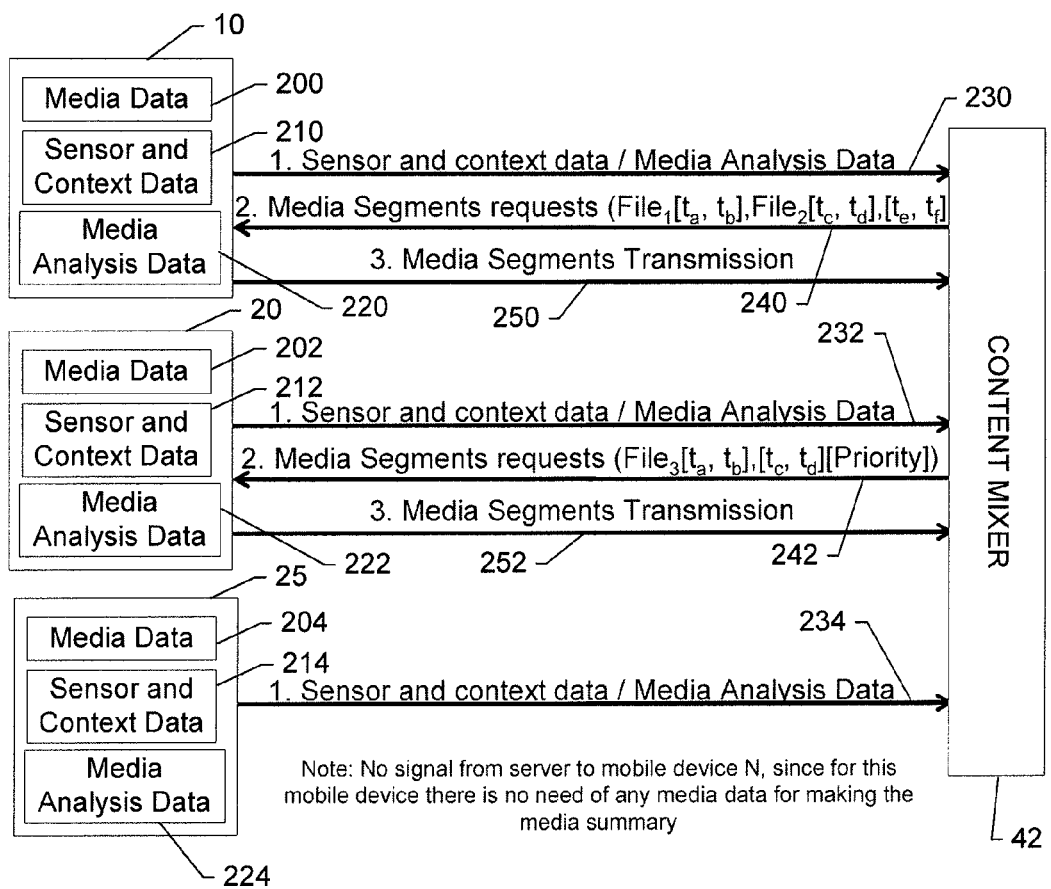
FIG. 4 illustrates an example of signaling between multiple devices and the content mixer and functions performed at each respective device according to an example embodiment of the present invention.

FIG. 4 illustrates an example of signaling between multiple devices (e.g., mobile terminal 10, second communication device 20 and third communication device 25) and the content mixer 42 and functions performed at each respective device according to an example embodiment. As shown in FIG. 4, each of the devices may be engaged in recording (or storing after recording) of the media data 200, 202 and 204. Each device may also collect sensor and context data 210, 212 and 214 (or generate the data in the case of derived sensor and context data). The context data may include, for example, device capabilities and network connectivity availability. Each device may also generate media analysis data 220, 222 and 224. In this example, all of the devices may provide sensor and context data along with the media analysis data to the content mixer 42 as indicated by communication 230, 232 and 234, respectively. Based on receipt of the sensor and context data along with the media analysis data, the content mixer 42 may determine which media segments to request as indicated above. Then, at messages 240 and 242, the content mixer 42 may request specific media segments from certain ones of the devices (e.g., mobile terminal 10 and second communication device 20 in this example), and not request any media segments from other devices (e.g., third communication device 25 in this example). Responsive to receipt of the requests, the corresponding devices that receive requests may then provide the requested media segments to the content mixer 42 at operations 250 and 252.

Example embodiments may therefore enable a reduction in the time and resource requirements associated with the production of mixed content since the mixed content may be produced responsive to a composite construction of media segments that are uploaded pursuant to a specific request for such segments rather than responsive to uploading of a plurality of entire files.

Figure 5:
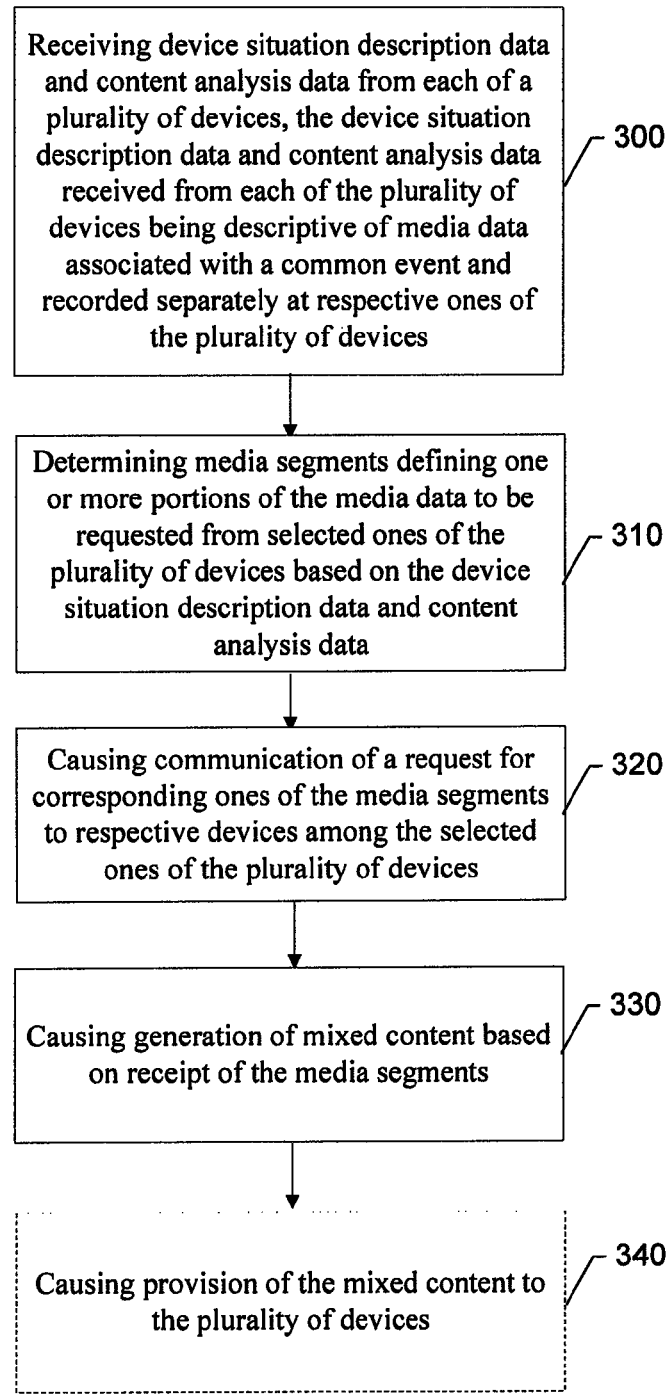
FIG. 5 is a block diagram according to an example method for providing media mixing with reduced uploading according to an example embodiment of the present invention.
Figure 6:
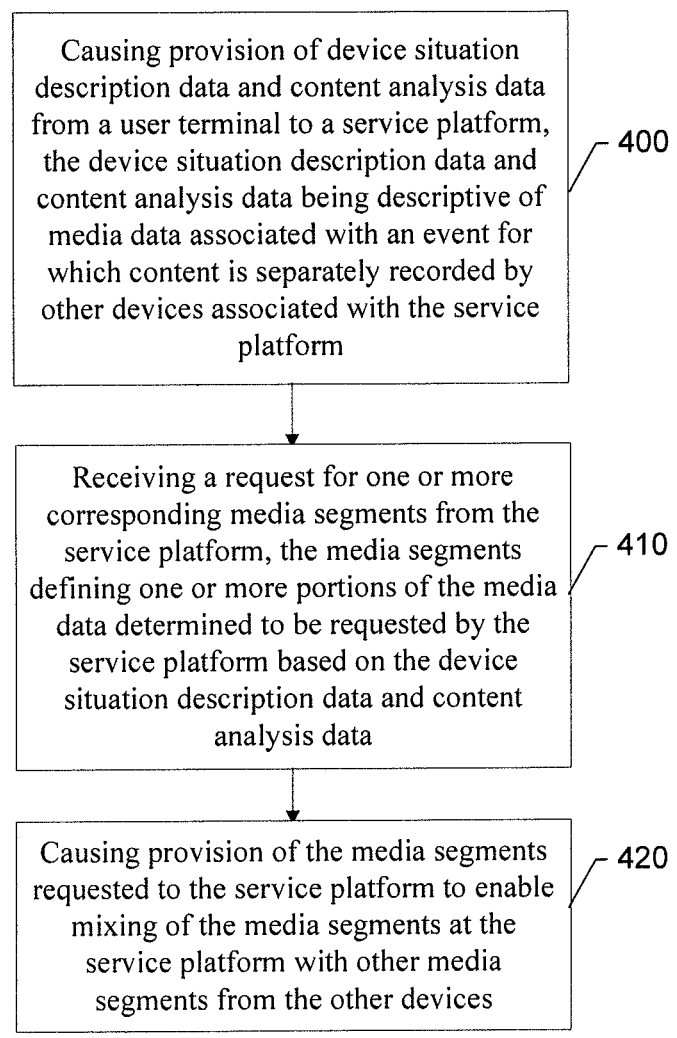
FIG. 6 is a block diagram according to an example method for facilitating media mixing with reduced uploading according to an example embodiment of the present invention.

FIGS. 5 and 6 are flowcharts of a method and program product according to example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of the mobile terminal or network device and executed by a processor in the mobile terminal or network device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowcharts block (s). These computer program instructions may also be stored in a non-transitory computer-readable storage memory that may direct a computer or other programmable apparatus to function in a particular manner, such that the instructions stored in the computer-readable storage memory produce an article of manufacture including means which implement the function specified in the flowcharts block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts block(s).

Accordingly, blocks of the flowcharts support combinations of means for performing the specified functions, combinations of operations for performing the specified functions and program instructions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In this regard, a method according to one embodiment of the invention from the perspective of a device for performing content mixing, as shown in FIG. 5, may include receiving device situation description data and content analysis data from each of a plurality of devices at operation 300. The device situation description data and content analysis data received from each of the plurality of devices may be descriptive of media data associated with a common event (e.g., a shared or same event) and recorded separately at respective ones of the plurality of devices. The method may further include determining media segments defining one or more portions of the media data to be requested from selected ones of the plurality of devices based on the device situation description data and content analysis data at operation 310. As an example, sensor and context data may be analyzed along with media analysis data to determine which media segments are to be requested to compose a summary content item of mixed content. In some cases, a skeleton of the summary content item may be built to be filled in with the corresponding media segments. The method may further include causing communication of a request for corresponding ones of the media segments to respective devices among the selected ones of the plurality of devices at operation 320, and causing generation of mixed content based on receipt of the media segments at operation 330.

In some embodiments, certain ones of the operations above may be modified or further amplified as described below. Moreover, in some situations, the operations described above may be augmented with additional optional operations (an example of which is shown in FIG. 4 in dashed lines). It should be appreciated that each of the modifications, augmentations or amplifications below may be included with the operations above either alone or in combination with any others among the features described herein. In an example embodiment, the method may further include causing provision of the mixed content to the plurality of devices at operation 340. In some cases, receiving device situation description data may include receiving raw sensor data and device context data or receiving sensor data and device context data responsive to analysis performed at respective ones of the plurality of devices. In an example embodiment, receiving content analysis data may include receiving media analysis data descriptive of content features extracted from the media data by respective ones of the plurality of devices. In some embodiments, causing communication of the request may include identifying media segments to be sent by respective ones of the selected ones of the plurality of devices based on temporal data (e.g., identifying a time interval $t_1$ to $t_2$). Alternatively, the media segments may be identified by frame numbers. In an example embodiment, causing communication of the request may include identifying media segments to be sent by respective ones of the selected ones of the plurality of devices based on priority.

In an example embodiment, an apparatus for performing the method of FIG. 5 above may comprise a processor (e.g., the processor 70) configured to perform some or each of the operations (300-340) described above. The processor may, for example, be configured to perform the operations (300-340) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 300-340 may comprise, for example, the content mixer 42. Additionally or alternatively, at least by virtue of the fact that the processor 70 may be configured to control or even be embodied as the content mixer 42, the processor 70 and/or a device or circuitry for executing instructions or executing an algorithm for processing information as described above may also form example means for performing operations 300-340.

In some cases, the operations (300-340) described above, along with any of the modifications may be implemented in a method that involves facilitating access to at least one interface to allow access to at least one service via at least one network. In such cases, the at least one service may be said to perform at least operations 300 to 340.

In another example embodiment, as shown in FIG. 6, a method for enabling content mixing from the perspective of a user terminal may include causing provision of device situation description data and content analysis data from a user terminal to a service platform at operation 400. The device situation description data and content analysis data may be descriptive of media data associated with an event for which content is separately recorded by other devices associated with the service platform. The method may further include receiving a request for one or more corresponding media segments from the service platform at operation 410. The media segments may define one or more portions of the media data determined to be requested by the service platform based on the device situation description data and content analysis data. The method may further include causing provision of the media segments requested to the service platform to enable mixing of media segments at the service platform with other media segments from the other devices at operation 420.

In some embodiments, certain ones of the operations above may be modified or further amplified as described below. Moreover, in some situations, the operations described above may be augmented with additional optional operations. It should be appreciated that each of the modifications, augmentations or amplifications below may be included with the operations above either alone or in combination with any others among the features described herein. In an example embodiment, receiving the request may include receiving a request identifying the media segments based on temporal data or based on priority. In some embodiments, causing provision of the device situation description data may include causing provision of raw sensor data and device context data or causing provision of sensor data and device context data responsive to analysis performed at the user terminal.

In an example embodiment, an apparatus for performing the method of FIG. 6 above may comprise a processor (e.g., the processor 170) configured to perform some or each of the operations (400-420) described above. The processor may, for example, be configured to perform the operations (400-420) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 400-420 may comprise, for example, the response manager 180. Additionally or alternatively, at least by virtue of the fact that the processor 70 may be configured to control or even be embodied as the response manager 180, the processor 170 and/or a device or circuitry for executing instructions or executing an algorithm for processing information as described above may also form example means for performing operations 400-420.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:
  at least one processor; and
  at least one memory including computer program code, the at least one memory and the computer program code configured to, with the at least one processor, cause the apparatus at least to:
  receive device situation description data and content analysis data from each of a plurality of devices, the device situation description data and content analysis data received from each of the plurality of devices being descriptive of media data associated with a common event and recorded separately at respective ones of the plurality of devices;
  determine media segments defining one or more portions of the media data associated with the common event to be requested from selected ones of the plurality of devices based on the device situation description data and content analysis data;
  cause communication of a request for corresponding ones of the media segments to respective devices among the selected ones of the plurality of devices, wherein each of the selected ones of the plurality of devices are caused to upload the media segment in response to the communication; and
  cause generation of mixed content of the common event based on a composite construction of the media segments received from the selected ones of the plurality of devices.

2. The apparatus of claim 1, wherein the at least one memory and the computer program code are further configured to, with the at least one processor, cause the apparatus to receive device situation description data by receiving raw sensor data and device context data or by receiving derived sensor data and device context data responsive to analysis performed at respective ones of the plurality of devices.

3. The apparatus of claim 1, wherein the at least one memory and the computer program code are further configured to, with the at least one processor, cause the apparatus to receive device situation description data by receiving sensor data and device context data while corresponding content is being recorded at respective ones of the plurality of devices or after recording of the corresponding content has been completed.

4. The apparatus of claim 1, wherein the at least one memory and the computer program code are further configured to, with the at least one processor, cause the apparatus to receive content analysis data by receiving media analysis data descriptive of content features extracted from the media data by respective ones of the plurality of devices.

5. The apparatus of claim 1, wherein the at least one memory and the computer program code are further configured to, with the at least one processor, further cause the apparatus to cause provision of a quality metric to the plurality of devices or perform audio time alignment based on feature vectors received from the plurality of devices.

6. The apparatus of claim 1, wherein the at least one memory and the computer program code are further configured to, with the at least one processor, cause the apparatus to cause communication of the request including identifying media segments to be sent by respective ones of the selected ones of the plurality of devices based on temporal data or based on priority.

7. The apparatus of claim 1, wherein the at least one memory and the computer program code are further configured to, with the at least one processor, cause the apparatus to cause communication of the request including identifying a single media or multiple medium for the media segments to be sent by respective ones of the selected ones of the plurality of devices.

8. A method comprising:
  receiving device situation description data and content analysis data from each of a plurality of devices, the device situation description data and content analysis data received from each of the plurality of devices being descriptive of media data associated with a common event and recorded separately at respective ones of the plurality of devices;
  determining media segments defining one or more portions of the media data associated with the common event to be requested from selected ones of the plurality of devices based on the device situation description data and content analysis data;
  causing communication of a request for corresponding ones of the media segments to respective devices among the selected ones of the plurality of devices, wherein each of the selected ones of the plurality of devices are caused to upload the media segment in response to the communication; and causing generation of mixed content of the common event based on a composite construction of the media segments received from the selected ones of the plurality of devices.

9. The method of claim 8, wherein receiving device situation description data comprises receiving raw sensor data and device context data or receiving derived sensor data and device context data responsive to analysis performed at respective ones of the plurality of devices.

10. The method of claim 8, wherein receiving device situation description data comprises receiving sensor data and device context data while corresponding content is being recorded at respective ones of the plurality of devices or after recording of the corresponding content has been completed.

11. The method of claim 8, wherein receiving content analysis data comprises receiving media analysis data descriptive of content features extracted from the media data by respective ones of the plurality of devices.

12. The method of claim 8, further comprising causing provision of a quality metric to the plurality of devices or perform audio time alignment based on feature vectors received from the plurality of devices.

13. The method of claim 8, wherein causing communication of the request comprises identifying media segments to be sent by respective ones of the selected ones of the plurality of devices based on temporal data or based on priority.

14. The method of claim 8, wherein causing communication of the request comprises identifying a single media or multiple medium for the media segments to be sent by respective ones of the selected ones of the plurality of devices.

15. An apparatus comprising:
at least one processor; and
at least one memory including computer program code, the at least one memory and the computer program code configured to, with the at least one processor, cause the apparatus at least to:
cause provision of device situation description data and content analysis data from a user terminal to a service platform, the device situation description data and content analysis data being descriptive of media data associated with an event for which content is separately recorded by other devices associated with the service platform;
receive a request for one or more corresponding media segments from the service platform, the media segments defining one or more portions of the media data associated with the event determined to be requested by the service platform based on the device situation description data and content analysis data; and
cause provision of the media segments requested to the service platform to enable mixing of the media segments at the service platform with other media segments from the other devices to create a composite construction of the event based on the media segments associated with the event, wherein the provision of the media segments is caused by the request.

16. The apparatus of claim 15, wherein the at least one memory and the computer program code are further configured to, with the at least one processor, cause the apparatus to receive the request by receiving a request identifying the media segments based on temporal data or based on priority.

17. The apparatus of claim 15, wherein the at least one memory and the computer program code are further configured to, with the at least one processor, cause the apparatus to cause provision of the device situation description data by causing provision of raw sensor data and device context data or causing provision of sensor data and device context data responsive to analysis performed at the user terminal.

18. A method comprising:
causing provision of device situation description data and content analysis data from a user terminal to a service platform, the device situation description data and content analysis data being descriptive of media data associated with an event for which content is separately recorded by other devices associated with the service platform;
receiving a request for one or more corresponding media segments from the service platform, the media segments defining one or more portions of the media data associated with the event determined to be requested by the service platform based on the device situation description data and content analysis data; and
causing provision of the media segments requested to the service platform to enable mixing of the media segments at the service platform with other media segments from the other devices to create a composite construction of the event based on the media segments associated with the event, wherein the provision of the media segments is caused by the request.

19. The method of claim 18, wherein receiving the request comprises receiving a request identifying the media segments based on temporal data or based on priority.

20. The method of claim 18, wherein causing provision of the device situation description data comprises causing provision of raw sensor data and device context data or causing provision of sensor data and device context data responsive to analysis performed at the user terminal.

* * * * *